No. 812,775. PATENTED FEB. 13, 1906.
S. STERLING.
VEHICLE HUB AND SPINDLE.
APPLICATION FILED MAY 26, 1905.
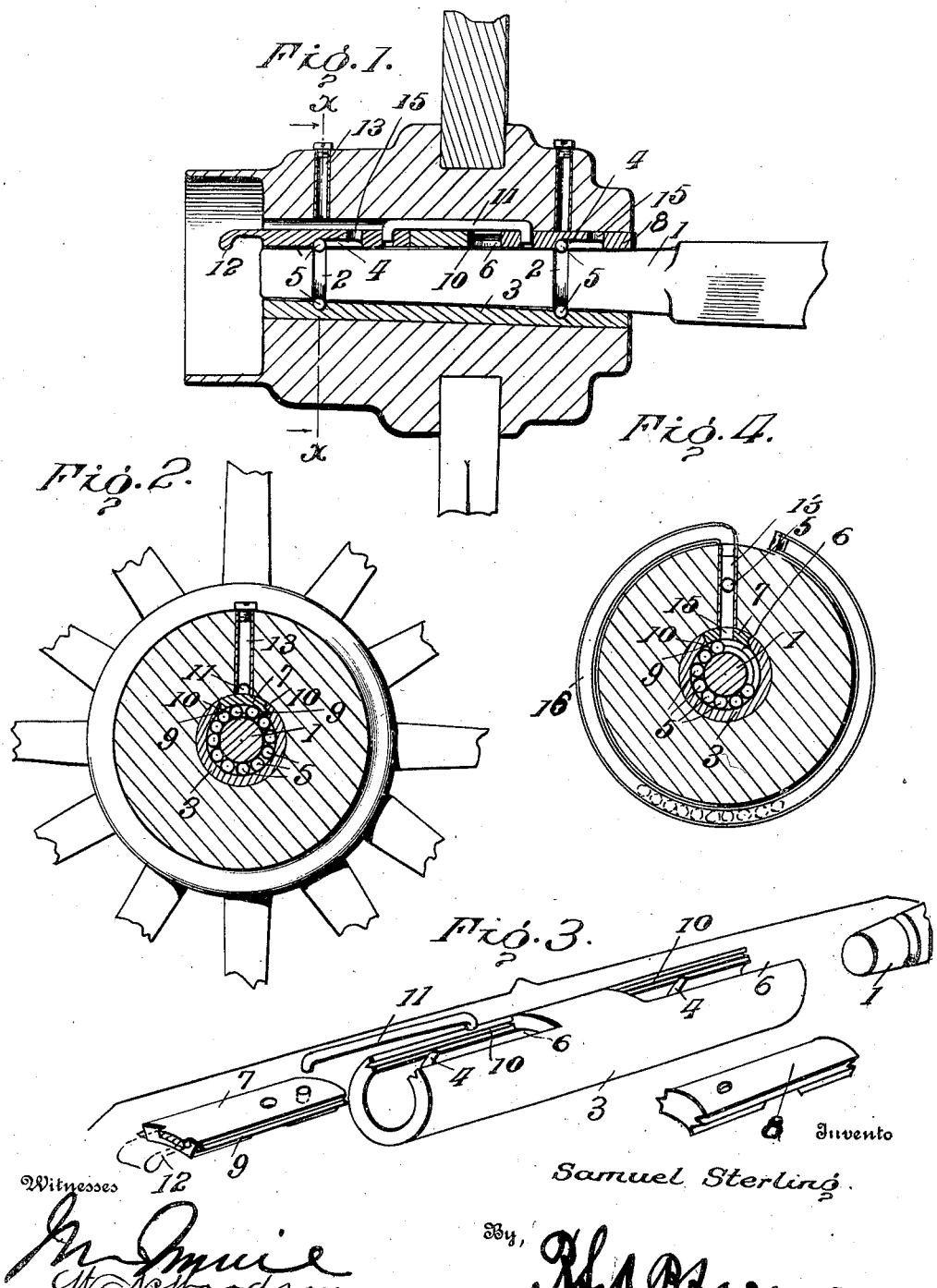

UNITED STATES PATENT OFFICE.

SAMUEL STERLING, OF CHICKASAWBA, ARKANSAS, ASSIGNOR OF ONE-HALF TO D. D. HODGES, OF PARAGOULD, ARKANSAS.

VEHICLE HUB AND SPINDLE.

No. 812,775.     Specification of Letters Patent.     Patented Feb. 13, 1906.

Application filed May 26, 1905. Serial No. 262,485.

*To all whom it may concern:*

Be it known that I, SAMUEL STERLING, a citizen of the United States, residing at Chickasawba, in the county of Mississippi and State of Arkansas, have invented certain new and useful Improvements in Vehicle Hubs and Spindles, of which the following is a specification.

This invention relates to improvements in spindles and boxing for vehicles; and it consists, essentially, of corresponding grooves in the spindle and boxing for the reception of balls and means whereby the balls may be quickly and easily removed or inserted.

It has for its object to produce a device of this character which will be positive in its operation and simple and durable in construction.

For a full description of the invention and the merits thereof and also to acquire a knowledge of the details of construction of the means for effecting the result reference is to be had to the following description and accompanying drawings, in which—

Figure 1 is a longitudinal sectional view. Fig. 2 is a transverse sectional view. Fig. 3 is a detail perspective view showing the various parts. Fig. 4 is a sectional view showing a modified form in which the tube extends entirely around the hub.

Corresponding and like parts are referred to in the following description and indicated in all the views of the drawings by the same reference characters.

The numeral 1 indicates the spindle, which is made so as to taper slightly toward the outer end and is provided with two annular grooves 2, which are preferably placed about one inch from the ends thereof. The axle-box 3 is tapered to correspond with the spindle and is provided on its inner surface with two annular grooves 4, corresponding to the grooves 2 on the spindle. The inner diameter of the axle-box is slightly larger than the external diameter of the spindle, so that when balls 5 are inserted in the space formed by the corresponding grooves, as will be hereinafter described, there will be only a rolling friction between the two surfaces. Slots 6 are cut into the opposite ends of the axle-box 3, so that they extend inward somewhat beyond the grooves 4, and slides 7 and 8, having tongues 9 along their edges to fit grooves 10 in the sides of the slots 6, are used in connection therewith. These slides are provided on their lower faces with transverse recesses or depressions, so that they will not interfere with the operation of balls in the annular grooves in the axle-box and spindle, and such slides are connected by a piece of wire 11, having its ends bent at right angles thereto and hooked through openings in the slides, so that they can be operated in unison. This wire is of such a length that the depressions in the slides are exactly the same distance apart as the annular grooves in the axle-box. The slide 8 on the inner end of the axle-box is made somewhat shorter than the slot and a handle 12 provided on the other slide 7, so that by pulling the handle 12 out the slides 7 and 8 will move until the end of slide 8 comes into contact with the end of the slot within which it operates. Openings 15 are drilled through these slides, so as to have communication with the recesses therein, so that when in this position they will be directly over the annular grooves 2 in the spindle 1 and allow the balls to be inserted therethrough. When the slides are pushed back, the balls are locked in position and the wheel is free to turn, but is held against lateral displacement. The hub of the wheel is provided with openings corresponding to those in the slides and having tubes 13 inserted therein, which are of a proper size and length to contain a sufficient number of balls to fill the grooves. A modification is shown in Fig. 4, in which the tube 13 is provided with an extension 16, which is bent around the hub and is adapted to contain the balls when same are not in use.

When the slides are pulled out by means of the handle 12, the balls in the tubes 13 will feed down around the spindle in the beforementioned grooves, and after the balls are all down the slides may be pushed back and the wheel will be locked in position. The operation of removing the wheel is the reverse of the above.

From the foregoing description it will be readily understood that I have invented a combined wagon spindle and boxing which is practical in construction and which enables the wheel to be easily and quickly removed or placed in position and which at the same time very materially reduces the friction and does away with the use of nuts, which are always more or less troublesome.

Having thus described the invention, what is claimed as new, and desired to be secured by Letters Patent, is—

1. In combination, a spindle having an annular groove, an axle-box provided with a mating annular groove, balls fitted into the space formed by means of the mating grooves to reduce friction and form interlocking means to retain the parts in coöperative position, and a slide provided with an opening for the entrance and the exit of the balls and adapted to confine said balls.

2. In a device of the character described, the combination of a spindle having an annular groove therein, an axle-box having a corresponding annular groove in its inner surface and having a slot extending inward from an end part past the annular groove, balls in the spaces formed by the two grooves, and a slide operating in said slot and having a transverse groove adapted to form a continuation of the annular groove in the axle-box and also having an opening for the insertion of balls when the slide is so placed that the opening therein is opposite the annular groove in the spindle.

3. In a device of the character described, the combination of a spindle having an annular groove therein, an axle-box having a corresponding groove in its inner surface and having a slot extending inward from an end and past the annular groove, balls in the spaces formed by the two grooves, a slide operating in said slot and having a transverse groove adapted to form a continuation of the annular groove in the axle-box, and also having an opening for the insertion of the ball when the slide is so placed that said opening is opposite the annular groove in the spindle, and a hub having an opening therein to coöperate with the opening in the side for the removal and insertion of the balls.

4. In a device of the character described, the combination of a spindle having an annular groove therein, an axle-box having a corresponding annular groove in its inner surface and having a slot extending inward from an end part past the annular groove, balls in the spaces formed by the two grooves, and a slide operating in said slot and having a transverse groove adapted to form a continuation of the annular groove in the axle-box and having an opening for the insertion of the balls when the slide is so placed that said opening is opposite the annular groove in the spindle, and also having a handle attached thereto for convenience of operation.

5. In a device of the character described, the combination of a spindle having a plurality of annular grooves therein, an axle-box having corresponding annular grooves in its inner surface and having a slot extending inward from each end, balls in the spaces formed by the grooves, slides operating in said slots and having transverse grooves adapted to form continuations of the annular grooves in the axle-boxes and also having openings for the insertion of the balls when the slides are so placed that said openings are opposite the annular grooves in the spindle, and means for connecting the slides so that they can be operated in unison.

6. In a device of the character described, the combination of a spindle having a plurality of annular grooves therein, an axle-box having corresponding annular grooves in its inner surface and having a slot extending inward from each end, balls in the spaces formed by the grooves, slides operating in said slots and having transverse grooves adapted to form continuations of the annular grooves in the axle-boxes and also having openings for the insertion of the balls when the slides are so placed that said openings are opposite the annular grooves in the spindle, and a rod connecting the two slides so that they can be operated in unison.

7. In a device of the character described, the combination of a spindle having a plurality of annular grooves therein, an axle-box having corresponding annular grooves in its inner surface and having a slot extending inward from each end, balls in the spaces formed by the grooves, slides operating in said slots and having transverse grooves adapted to form continuations of the annular grooves in the axle-boxes and also having openings for the insertion of the balls when the slides are so placed that said openings are opposite the annular grooves in the spindle, means for connecting the slides so that they can be operated in unison, and a hub having openings therein to coöperate with the openings in the slides for the removal and insertion of the balls.

In testimony whereof I affix my signature in presence of two witnesses.

SAMUEL STERLING. [L. S.]

Witnesses:
J. W. ROBERTSON,
STEVE MOORE.